United States Patent [19]

Hauser

[11] 3,772,750

[45] Nov. 20, 1973

[54] METHOD OF HOLLOW BALL FABRICATION

[75] Inventor: Daniel Hauser, Columbus, Ohio

[73] Assignee: TRW Inc., Cleveland, Ohio

[22] Filed: May 19, 1971

[21] Appl. No.: 144,757

[52] U.S. Cl. ............... 29/148.4 B, 29/463, 29/481, 219/121 EM
[51] Int. Cl. ............................................. B21h 1/14
[58] Field of Search ................ 29/463, 148.4 B, 29/480, 481, 482; 219/121 EM

[56] References Cited
UNITED STATES PATENTS

| | | | |
|---|---|---|---|
| 634,981 | 10/1899 | Hirth | 29/148.4 B |
| 2,804,559 | 8/1957 | Brewer | 29/463 X |
| 3,144,710 | 8/1964 | Hollander et al. | 29/148.4 B |
| 3,337,278 | 8/1967 | Vigh | 29/148.4 B |
| 3,466,910 | 9/1969 | Carlsen | 29/148.4 B |
| 3,599,307 | 8/1971 | Campbell et al. | 29/148.4 B |
| 3,660,880 | 5/1972 | Glenn | 29/463 X |

FOREIGN PATENTS OR APPLICATIONS

| 757,205 | 6/1933 | France | 29/148.4 B |
|---|---|---|---|

OTHER PUBLICATIONS

Welding Handbook section 3 fifth edition chapter 54 especially pages 54.2–54.9 and 54.18–54.32

*Primary Examiner*—J. Spencer Overholser
*Assistant Examiner*—Richard Bernard Lazarus
*Attorney*—Hill, Sherman, Meroni, Gross & Simpson

[57] ABSTRACT

A method of manufacturing a hollow sperical object such as a hollow ball bearing wherein two hemispherical sections are united. The sections are formed with hollow centerpoints and with mating tongue and ledge configurations adjacent the outer periphery. Indents are placed at the apex of the hemispheres for alignment in a turning machine. The hemispheres are united at the tongue and ledge and are subjected to an electron beam for welding of the hemispheres to a hollow ball form. Thereafter, the periphery of the sphere is machined and in the preferred embodiment is machined a radial distance sufficient to eliminate the welded step at the junction of the tongue and ledge, as well as to eliminate the indents.

4 Claims, 6 Drawing Figures

PATENTED NOV 20 1973 3,772,750
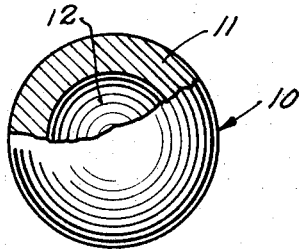
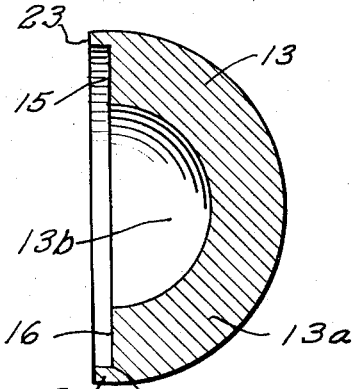
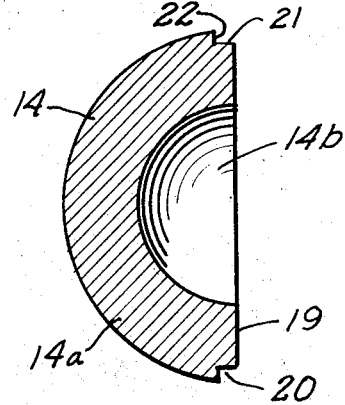
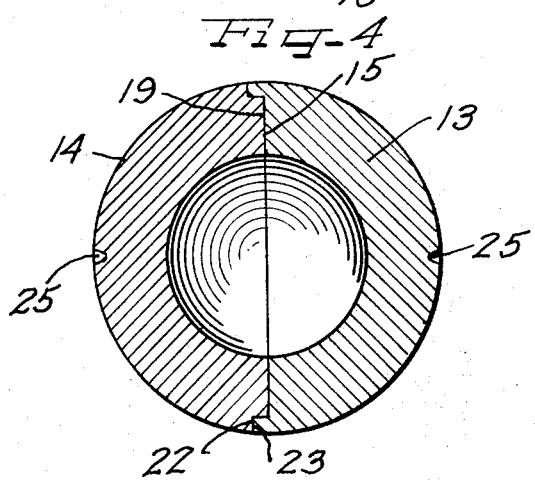
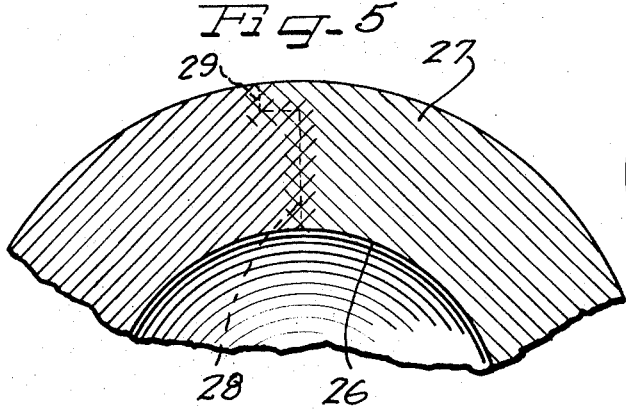
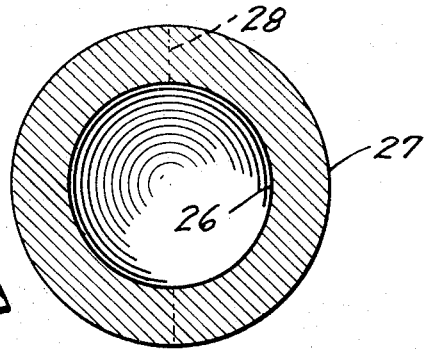
INVENTOR.
Daniel Hauser
BY Hill, Sherman, Meroni, Gross & Simpson
ATTORNEYS

METHOD OF HOLLOW BALL FABRICATION

BACKGROUND OF THE INVENTION

1. Field of the Invention

This invention relates to hollow spherical objects and to a method of manufacturing therefor.

2. Prior Art

Recent design and operating criteria have emphasized the desirability of using hollow ball bearings in place of the more normal solid balls. While such hollow balls have been known to the art for some time, they are extremely difficult to manufacture with any degree of precision. For this reason, the preexisting balls have normally been custom-manufactured by methods requiring a high coefficient of labor. While it has been suggested to use hollowed hemispherical components which are thereafter joined together as by welding, bonding and the like, extreme difficulties have arisen with regard to alignment of the hemispheres. Further prior art methods of joining have not always produced a perfect or even operatingly acceptable joinder.

It has been suggested to groove the opposed faces of the hemispheres so as to increase the sealed or welded surface area. (See for example U.S. Pat. No. 3,144,710 to Hollander et al.) While such grooves can also serve an aligning function, unless they are perfectly concentric, misalignment can be caused by the grooves. Further, because of the fact that a multiplicity of grooves are used, the weld may be more difficult to achieve and a serrated weld line is produced, which introduces the possibility of voids at the troughs, which voids would result in a weakness in the joined ball.

SUMMARY OF THE INVENTION

My invention overcomes many of the disadvantages of the prior art methods of manufacturing hollow balls, and provides a method adaptable to mass production machinery.

Initially, I began with two hemispheres which have hemispherical hollow sections at their center providing a peripheral wall. One of the hemispheres has a set back ledge provided circumferentially therearound at the outer periphery mating with the planar face of the hemisphere. The other hemisphere has a cooperating circumferential peripheral tongue dimensioned to mate with the ledge when the two hemispheres are joined together at their planar faces. Ninety degrees from the planar faces at the apex of the hemispheres, indents are provided for indexing with a rotating tool carried projection. The mating tongue and ledge provide for perfect alignment of the hemispheres, while the indents allow the joined ball to be gripped on opposing points for rotation in a fashion which will maintain the main joinder line in a given plane. Thereafter, the joined ball is subjected to an electron beam and is rotated with respect to the beam source to expose the entire circumference of the ball in the area of the joint to the beam. This results in a good weld along the joinder line.

In the preferred embodiment, after welding and further treating if desired, the periphery of the ball is machined to a point where a sufficient amount of material is removed to eliminate the indents. Further, in a preferred embodiment, the tongue and ledge are maintained radially narrow so that the machining process will remove material to a sufficient radial depth to eliminate that portion of the ball which, prior to welding, constituted the tongue and ledge.

It is therefore an object of this invention to provide an improved method of manufacturing hollow ball bearings.

It is a further and more specific object of this invention to provide a method of manufacturing hollow ball bearings wherein a cooperating ledge and tongue are provided on complimentary hollowed hemispheres to align the hemispheres.

It is a further object of this invention to provide a hollow ball bearing having hemispheres joined together by an electron beam welding process.

It is yet another and more specific object of this invention to provide a method of manufacturing hollow spherical objects from complimentary hemispheres, wherein one of the hemispheres has a circumferential ledge at its planar surface and the other hemisphere has a circumferential tongue cooperating with the ledge to index the hemispheres together along their opposed planar surfaces, the hemispheres being joined by a welding process.

It is yet another and more specific object of this invention to provide a method of manufacturing hollow spherical objects from hemispheres wherein indents are provided at the apex of the hemispheres to provide diametrically opposed machined gripping points when the hemispheres are joined, the indents being machined away after joinder of the hemispheres.

It is yet another and most specific object of this invention to provide a method of manufacturing a hollow spherical object from complimentary hemispheres wherein one of the hemispheres has an outer diameter ledge which mates with a circumferential projection on the other hemisphere, the hemispheres being welded together and the resultant ball thereafter machined to remove material to a sufficient radial depth to eliminate the area which comprised the tongue and complementary ledge.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a perspective view partially in section of a hollow ball bearing according to this invention.

FIG. 2 is a cross-sectional view of a hollow hemispherical ball section having a ledge at the periphery thereof.

FIG. 3 is a view similar to FIG. 2, illustrating the opposed hemispherical sections having a ledge dimensioned to mate with the tongue.

FIG. 4 is a cross-sectional view of a hollow ball comprised of the hemispheres of FIGS. 2 and 3 joined together, illustrating machine alignment indents.

FIG. 5 is a fragmentary cross-sectional view illustrating the effect of the electron beam welding step of this invention.

FIG. 6 is a cross-sectional view of a joined hollow ball manufactured according to this invention, after machining.

DESCRIPTION OF THE PREFERRED EMBODIMENT

FIG. 1 illustrates a hollow ball bearing 10 which consists of a continuous spherical circumferential wall 11 having a hollow interior 12.

Such ball bearings have considerable advantages in certain situations over solid bearings, including advantages derived from mass reduction and correspondent inertial reduction. It has been found that such hollow bearings operate for longer periods of time under increased heat conditions, as well as being advantageous in other situations.

This invention provides a method of manufacturing such hollow bearings. The method commences with two hemispherical sections 13 and 14 illustrated in FIGS. 2 and 3.

The hemispherical section 13 illustrated in FIG. 2 comprises a hemispherical section 13a of the peripheral wall 11 and a hemispherical section 13b of the hollow center 12. The planar face 15 defining the base of the hemisphere has a reduced central portion 16 which defines an outer diameter circumferential tongue 17 projecting at a right angle 18 from the planar face reduction 16.

The other hemispherical section 14 illustrated in FIG. 3 comprises a complementary hemispherical wall section 14a and a complementary hemispherical hollow center 14b. The base of the hemisphere is defined by a planar face 19, and has an outer diameter circumferential right angle reduction area defining a ledge 20 having right-angle faces 21 and 22 with the face 22 parallel to the face 19. The face 23 of the tongue 17 is also parallel to the face 16 of the reduction area of the planar face 15 of the section 13.

The ledge 20 provided by the reduction has a dimension co-extensive with the tongue 17. As can be seen from FIG. 4, when the two hemispheres are brought together with the planar face 19 abutting the planar face 16, the tongue 17 will fully extend into the ledge 20 with the face 23 of the tongue abutting the face 22 of the ledge, and the inner diameter of the tongue abutting the face 21 of the ledge 20. Thus, when the two hemispheres are joined together in face-to-face relation, a hollow sphere is created. Through the use of the indexing tongue and ledge, a sphere is assured which has a defined hollow interior with a continuous radius. Without the indexed tongue and ledge, it would be difficult to mate the two hemispheres with perfect indexing of the hollow interior. Absent a perfect indexing of the hollow interior, when a joined-together ball was machine finished on the exterior, there would be an out-of-balance condition created by the offset of one interior diameter with respect to the other interior diameter of the two hemispheres. This would create an erratically balanced ball which would either fail or allow the causation of extreme damage to the unit in which it is used.

As illustrated in FIG. 4 in the preferred embodiment, indents 25 are formed at the apex of the hemispheres 13 and 14. The indents take the form of small blind openings precisely centered at the apex of the hemisphere. These form positioning points for the gripping members of a turning machine so that the assembled ball can be turned precisely on an axis normal to the plane of the mating faces of the hemispheres.

After the hemispheres have been assembled together, the resultant ball is mounted in a turning machine and is subjected to an electron beam and rotated thereunder to weld the two hemispheres together. By means of the use of an electron beam welding procedure, a continuous weld can be assured from the inner diameter 26 of the hollow ball to the outer diameter 27 thereof, as is illustrated in FIG. 5 where the cross hatch 28 is intended to signify a complete weld through the area illustrated by the broken line 29 indicating where the hemispheres were joined prior to welding.

Although FIG. 5 illustrates a 100 percent depth penetration weld, it may be desirable in certain circumstances to limit the weld to approximately 90 percent of the depth so as to prevent the formation of any flash on the inner diameter. Further, the preferred embodiment has been described as being welded by an electron beam. However, it is to be understood that other methods may be utilized such as inertial welding, diffusion bonding, or the like.

After welding the hemispheres, the outer diameter is machined to provide the finished ball. Such a machined ball is illustrated in FIG. 6, wherein neither the inner diameter 26 nor the outer diameter 27 have any indication of where the joinder line was. This is a preferred embodiment, and the dotted line 28 indicates where the joinder was. During the machining operation, a sufficient depth of the outer diameter is removed to reduce the outer diameter to a point less than the face 21 of the ledge 20. In this manner, the entirety of the tongue and ledge configuration has been removed along with the alignment indents 25.

Although the indents 25 are illustrated as being point pricks, it is to be understood that other configurations may be used such as flat spots or bulges or the like.

It will be seen from the above that my invention provides a method of manufacturing a hollow sphere from mating hemispheres wherein one of the hemispheres carries an outer diameter tongue projecting from its planar face and the other hemisphere has a mating outer diameter reduction ledge at its planar face, the tongue and ledge indexing to align the inner and outer diameters of the hemispheres to a sphere configuration. In the preferred embodiment, surface interruptions are provided at the apex of the hemispheres to align the hemispheres in a rotating machine and the assembled sphere is subjected to a welding operation to bond the hemispheres together. Thereafter, the resultant sphere is machined on its outer diameter to a sufficient depth to remove the material from the outer diameter to reduce the outer diameter to a point less than the original ledge point.

Although I have herein set forth my invention with respect to certain specific principles and details thereof, it will be understood that these may be varied without departing from the spirit and scope of the invention as set forth in the hereunto appended claims.

I claim as my invention:

1. A method of manufacturing a hollow ball bearing comprising: the steps of forming a pair of hemispheres having central cavities, the hemispheres having equal inner diameters and equal outer diameters with a planar face formed between the inner and outer diameters, forming an outer diameter tongue on one of the hemispheres, the tongue extending at a right angle from the planar face of the hemisphere, forming an outer diameter reduction ledge on the other of said hemispheres, the said ledge formed at the juncture of the planar face and the outer diameter, the said ledge and tongue having coextensive dimensions, joining the two hemispheres together at the planar faces with the tongue projecting into the ledge and the inner and outer diameters of the hemispheres aligned, subjecting the resultant sphere to an electron beam welding joining operation to join the two hemispheres together permanently at their planar faces and machining the resultant sphere to reduce the outer diameter to a point sufficient to remove the ledge.

2. The method of forming a hollow sphere which comprises the steps of providing a pair of hemispheres having equal central cavities forming inner diameters concentric with the outer diameters, forming surface interruptions at the apex of the hemispheres, mating the hemispheres together at their planar faces, turning the mated hemispheres at least one revolution while an electron beam is directed at the mating faces of the hemispheres to weld them together and using the surface interruptions to hold the hemispheres in alignment with the beam during turning and machining the outer diameter of the resultant sphere to a sufficient depth to remove the surface interruptions.

3. The method of forming a hollow sphere which comprises: the steps of forming a pair of hemispheres with central cavities providing an inner diameter concentric with and with a planar face therebetween, forming an outer diameter projecting tongue extending at right angles to the planar face of one of the hemispheres, forming an outer diameter reduction ledge extending at right angles from the planar face of the other hemisphere, the ledge and tongue having substantially co-extensive dimensions and opposed planar surfaces, mating the hemispheres together with the opposed planar surfaces in mating relation with one another and the inner and outer diameters aligned, forming surface interruptions at the apexes of the hemispheres, rotating the resultant sphere, subjecting the rotating sphere to a bonding force, and thereafter machining the outer diameter of the bonded-together sphere to remove the surface interruptions while maintaining the outer surface spherical, and continuing the machining to a point where the outer diameter has been reduced to a diameter at least as small as the minimum diameter of the ledge.

4. The method of claim 3 wherein the bonding force is an electron beam.

* * * * *